United States Patent [19]

Ohnsorge

[11] 4,134,071
[45] Jan. 9, 1979

[54] SSMA DATA TRANSMISSION SYSTEM

[75] Inventor: Horst Ohnsorge, Erstetten, Germany

[73] Assignee: Licentia Patent-Verwaltungs-G.m.b.H., Frankfurt am Main, Germany

[21] Appl. No.: 164,077

[22] Filed: Jul. 19, 1971

[51] Int. Cl.² .............................................. H04B 1/10
[52] U.S. Cl. ...................................... 325/42; 325/32; 325/474
[58] Field of Search ...................... 178/22; 179/1.5 R; 325/32, 33, 34, 42

[56] References Cited

U.S. PATENT DOCUMENTS

| 3,876,947 | 4/1975 | Giraudon | 325/474 X |
| 3,988,538 | 10/1976 | Patten | 178/22 |

Primary Examiner—T.H. Tubbesing
Attorney, Agent, or Firm—Spencer & Kaye

[57] ABSTRACT

In an SSMA data transmission system in which each binary information signal ($k_{ij}$) is multiplied with a binary address $a_i(t-jT)$ having Z binary digits and is transmitted after being modulated onto a carrier oscillation signal $\cos(\omega_i t)$, the effective signal-to-noise ratio for the desired received signal is improved by providing each receiver station, e. g., the $m^{th}$ receiver station, with means for reproducing the transmitted data-functions $k_i(t)$ by $k_i^*(t)$ of at least one of the stations $i \neq m$ by correlation of the received total signal $f_e(t)$ by $$g^* a_i(t) = a_i^* (t-jT-\tau_i^*) \cos(\omega_i^* t - \phi_i^*)$$

and forming $$f_i^*(t) = K_i^*(t) \cdot a_i^*(t-jT-\tau_i^*) \cos(\omega_i^* t - \phi_i^*);$$

means for subtracting each of the thus reproduced transmitting functions from the received mixture signal $f_e(t)$ to produce a derived received signal $f_e^*(t)$; and means for determining the desired data sequence $K_m^*(t)$ by correlating only the signal $f_e^*(t)$ with the address $g^* a_m(t)$ for the $m^{th}$ station.

11 Claims, 6 Drawing Figures

SSMA DATA TRANSMISSION SYSTEM

BACKGROUND OF THE INVENTION

The present invention relates to an SSMA (Spread Spectrum Multiple Access) data transmission system in which each binary information signal ($k_{ij}$) is multiplied with a binary function or with an address $a_i$ (t−j T) having Z binary digits and is transmitted possibly after being modulated on a carrier oscillation cos ($\omega_i$t), and wherein the $m^{th}$ user station at the receiving end determines the interfered with receiving function $K_m^*(t)$ intended for that station by correlating the total received function mixture signal $f_e(t)$ with the carrier-modulated address signal $g^*a_m(t)$ for that particular station.

A number of possibilities have long been known in the art whereby a plurality of stations may communicate with one another over a common transmission channel without mutual interference. For example, it is known to divide the transmission band into partial frequency bands (frequency multiplex) or to associate time spots in a PCM raster to the individual stations (time multipliex).

A new method for achieving this result is also known which is called the SSMA method (time function multiplex). A system using the SSMA method is described, for example, in the article "Modulation Techniques for Multiple Access to a hard-limiting Satellite Repeater" by J. W. Schwartz, J. M. Aein, and J. Kaiser; Proceedings of the IEEE, Vol. 54, No. 5, May 1966, Pages 763–776. In this method the information is first digitalized (PCM or Δ-modulation) and then each binary signal $k_{ij}$ (low frequency band b) is multiplied with a binary function or address $a_i(t-jT)$ having Z binary digits. During the duration of a data binary signal T, Z address binary digits are thus transmitted which corresponds to a spread of the low frequency band b to the value B = Z · b. The function $K_i(t) · a_i(t-jT)$ is then carrier-modulated so that the function or signal $f_i(t) = K_i(t) · a_i(t-jT) · \cos(\omega_i t)$ is being transmitted. The function $f_i(t)$ requires the entire bandwidth of the transmission channel. The transmitting functions of all stations are thus additively superimposed so that each station receives the total mixture signal $f_e(t)$ where $$f_e(t) = \sum_i k_i(t) a_i(t - jT - \tau_i) \cos(\omega_i t - \phi_i)$$

For station m the signals in the received signal $f_e(t)$ other than the desired signal $f_m(t)$, i.e., the function $$f_e(t) - f_m(t) = \sum_{i \neq m} k_i(t) a_i(t - jT - \tau_i) \cos(\omega_i t - \phi_i)$$

thus represents an interference which almost has a noise characteristic. When each transmitting station connected to the transmission channel provides a signal which produces an output signal $S_E$ at each receiver site, and the channel has its own noise R, each receiver receives its useful signals with a signal-to-noise ratio S/N of $$S/N = \frac{S_E}{R + (n-1)S_E} = \frac{1}{\frac{R}{S_E} + n - 1} << 1$$

for the situation of n stations transmitting simultaneously. For the station m, by means of a correlation process, the function $K_m^*(t)$, which represents the error-containing transmitted function $K_m(t)$, is reproduced from this noise with a signal-to-noise ratio of $$\frac{S}{N} >> 1.$$

The function $K_m^*(t)$ is usually produced by multiplying the received mixture signal $f_e(t)$ with the carrier-modulated address signal for the station m $$g^*a_m(t) = a_m^*(t - jT - \tau_m^*) \cos(\omega_m^* t - \phi_m^*),$$

where $g^* a_m(t)$ is the address with carrier in the receiving station m not yet exactly sychronized and carrier-controlled to the received addresses and for the case where $$g^* a_m(t) = ga_m(t),$$

where $ga_m(t)$ is the synchronized and controlled sequence of addresses the following results:

$$k_{mj}^* = \text{sign} \int_{\tau_m - jT}^{\tau_m - jT + T} \{f_m(t) + [f_e(t) - f_m(t)]\} ga_m(t) \cdot dt$$

where $k_{mj}^*$ is the transmitted binary signal $k_{mj}$ falsified by the interfering value $[f_e(t) - f_m(t)] \cdot g\ a_m(t)$. The closer this interfering value compares to $f_m^2(t)$, the greater becomes the probability of an error for $k_{mj}^*$. Difficulties in the SSMA method existed in the derivation of $g^*a_m(t) \approx ga_m(t)$ and in the determination of the most favorable function collective $a_i(t - jT)$. These problems have been solved to an almost satisfactory degree. Theoretically, however, $$f_{st} = \int_{\tau_m - jT}^{\tau_m - jT + T} [f_e(t) - f_m(t)] ga_m(t) dt = 0$$

can only be realized by an orthogonal function system (e.g., Walsk functions). Such a system is of no use, however, since it leads to unsurmountable synchronizing difficulties. Thus, according to the present state of the art, SSMA has the drawback, when compared with the orthogonal frequency multiplex and time multiplex methods, of producing interference inherent to the system which principally means a reduction of the channel capacity compared to the older methods.

Since, however, SSMA offers a number of other advantages, e.g., for synchronization problems, a simple way of assuring the secrecy of the transmitted data, and few filtering problems, as compared to the older methods, it is desirable in many instances to utilize this method.

SUMMARY OF THE INVENTION

It is therefore the object of the present invention to substantially eliminate the principal drawback of the SSMA method of data transmission.

The present invention is based on the realization that an optimization of the collective function $a_i(t-jT)$ furnishes $f_{st} \neq 0$. Thus, the function [fe(t) − $f_m(t)$] must be reduced if an improvement in the above-mentioned sense is to be obtained for such a system.

The above object is achieved according to the present invention in that each station, e.g., station m, reproduces the transmitting functions $f_i(t)$ of each of the stations $i \neq m$ by means of the known correlation of the received total signal $f_e(t)$ according to the relationship $$f_i^*(t) = K_i^*(t) \cdot a_i^*(t - jT - \tau_i) \cos(\omega_i^* t - \phi_i^*).$$

These reproduced transmitting functions $f_i(t)$ are then subtracted from the received mixture signal $f_e(t)$ so that a derived received signal $f_e^*(t)$ results and finally the desired sequence of data $K_m^*(t)$ is determined by correlation of this derived signal $f_e^*(t)$ with the address $g^* a_m(t)$ of the station.

The transmitted functions $f_i(t)$ for stations $i \neq m$ are reproduced at the receiving station m by correlating the received mixture signal $f_e(t)$ with the address $g^* a_i(t)$ of the stations $i \neq m$ and then modulating the resulting signal $K_i^*(t)$ with the carrier frequency. According to various embodiments of the invention, the functions $f_i(t)$ may be generated and subtracted from the received signal $f_e(t)$ either in series or in parallel or a combination thereof. Additionally, according to other embodiments of the invention, feedback may be utilized to further suppress the interfering signals which tend to produce errors in the received signal. Moreover, according to the present invention it is possible to obtain any desired degree of suppression of the above-mentioned interferences.

DESCRIPTION OF THE PREFERRED EMBODIMENTS

To eliminate the above-mentioned drawbacks of SSMA systems, according to the present invention, three basic receiving systems are illustrated which evolve from one another and produce an improvement of the signal-to-noise ratio S/N. In the basic block circuit diagrams of FIGS. 1 and 3, a system with three receiving stations is illustrated, the illustrated receiving system being the third receiving station, i.e., m = 3. It is to be understood, however, that the use of three stations is illustrative only and any number of receiving stations may be included in the system.

Figure 1:
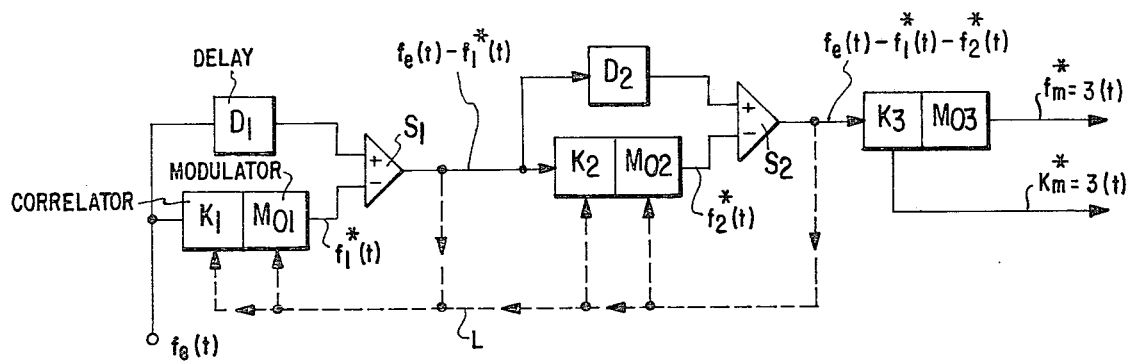
FIG. 1 is a schematic block circuit diagram illustrating one basic embodiment of the invention using a serial sequence of correlations and subtractions.

FIG. 1 shows a first embodiment of the system according to the invention. The received mixture signal $f_e(t)$ is fed to one input of the receiving system and is fed to the input of a first correlator $K_1$ in which the received mixture is correlated in a known manner with the first received function. This correlator is so designed that it performs the correlation in the correct phase with respect to the carrier oscillation of the received function and also according to the address of the desired received function, which has to be eliminated from the received mixture signal $f_e(t)$, before the desired received function is detected by a correlation process out of the rest of the received mixture signal. Such a correlator is known, for example, from the German Offenlegungsschrift No. 1,916,354 published Oct. 1, 1970. The correlator furnishes at its output the address modulated with the data contents, i.e., the function $k_{1j}^*$ or $K_1^*(t)$. This function is fed to a modulator $M_{01}$ and there again modulated with the carrier frequency. The output signal from the modulator $M_{01}$ is thus the interferred-with received function $$f_1^*(t) = K_1^*(t)\, a_1^*(t - jT - \tau_1^*) \cos(\omega_1^* t - \phi_1^*).$$

This function $f_1^*(t)$ is then fed to one input of a subtraction member $S_1$ to whose other input is supplied the received total mixture signal $f_e(t)$. Since, in practical circuit realization, the correlator $K_1$ and the modulator $M_{01}$ produce delays, the received mixture signal $f_e(t)$ is not fed directly to the subtraction member $S_1$, but rather via a delay member $D_1$ which provides compensation for the delays of the correlator $K_1$ and of the modulator $M_{01}$.

At the output of the subtraction member $S_1$ there is provided a function equal to the difference between the received mixture function and the first interfered-with received function, i.e., $f_e(t) - f_1^*(t)$. This difference function is then processed in an analogous manner in a second correlation process by a second correlator $K_2$ and a second modulator $M_{02}$ to produce the function $f_2^*(t)$. The output of the modulator $M_{02}$ is fed to one input of a second subtraction member $S_2$ to whose other input is applied the output of subtraction member $S_1$ via a further delay member $D_2$. At the output of the second subtraction member $S_2$ there thus appears the value $f_e(t) - f_1^*(t) - f_2^*(t)$.

In this example it is assumed that now, since the interfering received functions $f_1^*$ and $f_2^*$ are eliminated, the received function $K_{m=3}^*(t)$ which is actually desired at the receiving end can be determined. This is done in a manner similar to the one described above, i.e., by a correlator $K_3$ whose output value is the desired received function. The modulator $M_{03}$ connected to the output of correlator $K_3$ is not actually required here and is of significance only when a feedback is to be produced as it will be explained in connection with FIGS. 5 and 6.

FIG. 1 additionally contains a number of feedback connections L (shown in dashed lines) from the output of the subtraction members $S_1$ and $S_2$ which serve to transmit control signals. These feedback control signals are utilized, according to the present invention, to adjust the modulators $M_{01}$ and $M_{02}$ and possibly also the correlators $K_1$ and $K_2$, so that the difference signals appearing at the outputs of the subtracting members $S_1$ and $S_2$ have the lowest possible signal energy; i.e., the difference signals are minimized. In this manner, the undesirable interference by the functions $f_{i \neq m}^*(t)$ is minimized. Although not illustrated, similar feedback control signals may be utilized in the embodiments of FIGS. 2 and 3.

The control of the delay, the modulator, and the correlator is realizable in many different ways known by usual techniques. All types of control need a control criteria, and one criteria can be the energy of the output of address $S_1$, $S_2$ (FIG. 1). This energy is to be minimized, with the minimum of the energy being reached when we exactly eliminate the undesired function $f_1*(t)$ or $f_2*(t)$ from the received mixture signal. The phase of the binary address in the correlator, the frequency and phase of the carrier in the correlator, and also the frequency and phase in the modulators can be controlled by the above described criteria in the usual way, i.e., German Offenlegungsschrift No. 1,916,354. The delay line $D_i$ need not be controlled continuously because it serves only for compensating the delay of the correlator and modulator $K_i$, $M_{0i}$. It is sufficient to adjust the delay line $D_i$ at the beginning of the operation and that can be done by hand adjustion in the usual way.

Figure 2:
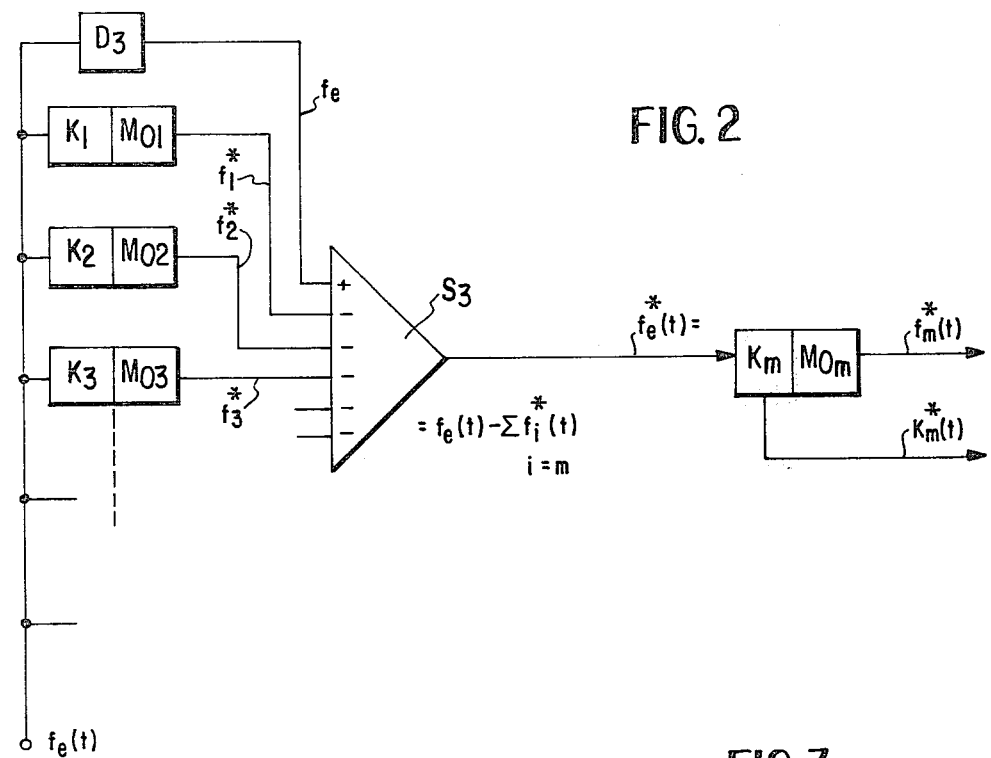
FIG. 2 is a schematic block circuit diagram illustrating a second basic embodiment of the invention wherein parallel operation is utilized for the correlations and subtractions.

Instead of the series operation illustrated in FIG. 1, in the basic embodiment according to FIG. 2 the interfering functions $f_1(t)$, $f_2(t)$, etc., are eliminated in parallel and thus simultaneously. In this embodiment, the received mixture function $f_e(t)$ is fed to the input of each of a plurality of parallelly connected combinations of correlators and modulators $K_1$, $M_{01}$; $K_2$, $M_{02}$; etc. which, in a manner similar to that described for FIG. 1, form the received functions $f_1*$, $f_2*$, etc. The correlator/modulator combinations are so designed that they all effect uniform delay of the signal passing therethrough. The received total mixture function $f_e(t)$ is fed via a delay member $D_3$, which compensates the above-mentioned delay of the correlator/modulator combinations, to the input of a subtraction circuit $S_3$ whose other inputs receive the interfered-with received functions $f_1*$, $f_2*$, etc. At the output of subtraction circuit $S_3$ the difference function $$f_e(t) - \sum_{i \neq m} f_i^*(t)$$

is then available.

In FIG. 2 it is assumed that this difference value is now clearly free of interferences so that in correlator $K_m$ the desired received function $K_m*(t)$ can now be formed.

Figure 3:
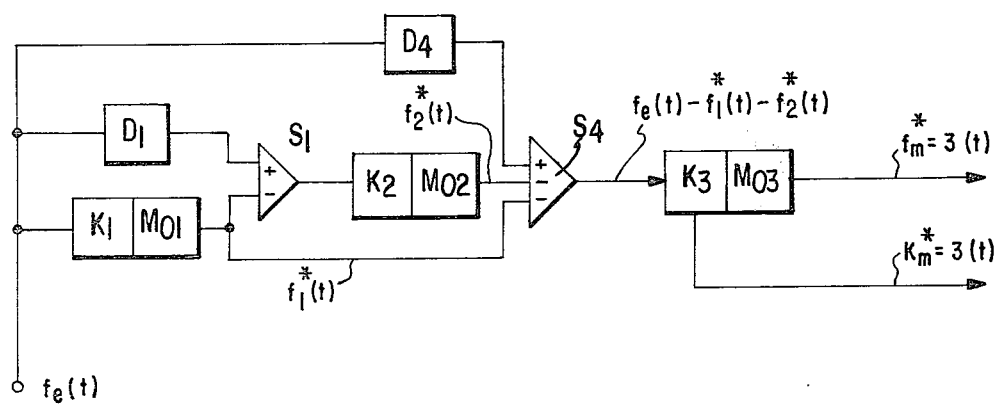
FIG. 3 is a schematic block circuit diagram of a third basic embodiment of the invention utilizing a combination of series and parallel operations for the correlations and subtractions.

FIG. 3 shows a somewhat different basic embodiment of a receiving system according to the invention utilizing a combination of series and parallel operations. In this embodiment, the value $f_1*(t)$ is first derived from the received mixture by $K_1$, $M_{01}$. This value is subtracted from the received mixture signal $f_e(t)$ in the subtracting circuit $S_1$ and the difference signal is fed to the correlator/modulator combination $K_2$, $M_{02}$ to form the function $f_2*(t)$ in the same manner as in FIG. 1. In this embodiment, however, the output value of $M_{02}[f_2*(t)]$, the value $f_1*(t)$ and, via a delay member $D_4$, the received mixture signal $f_e(t)$ are fed to the respective inputs of a subtraction member $S_4$ at whose output the received mixture signal is available after the values $f_1*(t)$, $f_2*(t)$ have been subtracted, i.e., the value $f_e(t) - f_1*(t) - f_2*(t)$. From this difference value appearing at the output of subtracting member $S_4$ the desired received function $K_{m=3}*(t)$ is then derived in correlator $K_3$.

In the ideal case in the above-described embodiments, i.e., when $f_i*(t) = f_i(t)$, the following would apply:

$$k_{mj}^* = \text{sign} \int_{\tau_m - jT}^{\tau_m - jT + T} g a_m(t) f_m(t) = k_{mj}$$

As a practical matter, however, the relationship $$f_i^*(t) = f_i(t)$$

cannot be realized so that in this method a slight residual error probability still remains. The lowest error probability is offered by the output function of the last correlation stage since this is interfered with only by the residual error of the preceding stages. In a further development of the invention it is therefore proposed to repeat the first receiving process in that the most error-free function $f_m*(t)$ is first subtracted from $f_e(t)$ and then one derives $f_e(t)$ therefrom. From $f_e(t)$ one derives, in sequence, $K_{m-1}(t)$, $K_{m-2}(t)$, etc., until the desired function, e.g., $K_1**(t)$, is obtained. This iteration process can be repeated as often as desired so that theoretically the residual error probability can be placed at any desired level.

Figure 4:
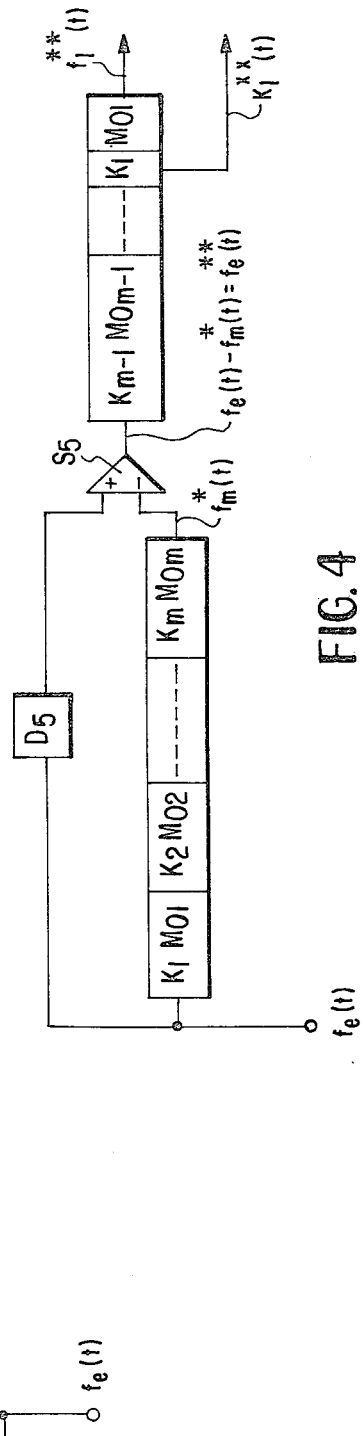
FIG. 4 is a schematic block circuit diagram illustrating a further embodiment of the invention using a plurality of circuits as illustrated in FIGS. 1-3.

The apparatus for carrying out this iterative correlation process is illustrated in FIG. 4 wherein the desired received function is determined in the following manner:

Initially, the almost error-free transmitting function $f_m*(t)$ is derived from the received mixture function $f_e(t)$. The transmitting function $f_m*(t)$ is derived in an arrangement which is shown in FIG. 4 by a block consisting of the correlator/modulator combinations $K_1$, $M_{01}$; $K_2$, $M_{02}$; ... $K_m$, $M_{0m}$. This block may be replaced, for example, by the arrangement of FIG. 1, FIG. 2 or FIG. 3. In a subtracting circuit $S_5$ the almost interference-free transmitting function $f_m*(t)$ is now subtracted from the appropriately delayed received mixture function $f_e(t)$ which is applied to an input of the subtracting circuit $S_5$ via an appropriately dimensioned delay member $D_5$. The resulting output function from subtracting circuit $S_5$ is the function marked $f_e(t)$. From the latter function the desired function, in this example $K_1(t)$, is derived in a repeated correlation process which is represented by a block $K_{m-1} M_{0m-1} \ldots K_1$. This second block which is contained in FIG. 4 may again be represented by an arrangement according to FIGS. 1, 2 or 3.

The iterative correlation technique of FIG. 4 requires a relatively large amount of circuitry. Therefore, according to a further development of the present invention, it is proposed to provide a feedback from the last stage to the first stage so that the previous correlation processes no longer contain the desired output function. The last correlation stage then forms the desired signal from the desired received function which is interfered with by only the residual errors of the preceding stages.

Figure 5:
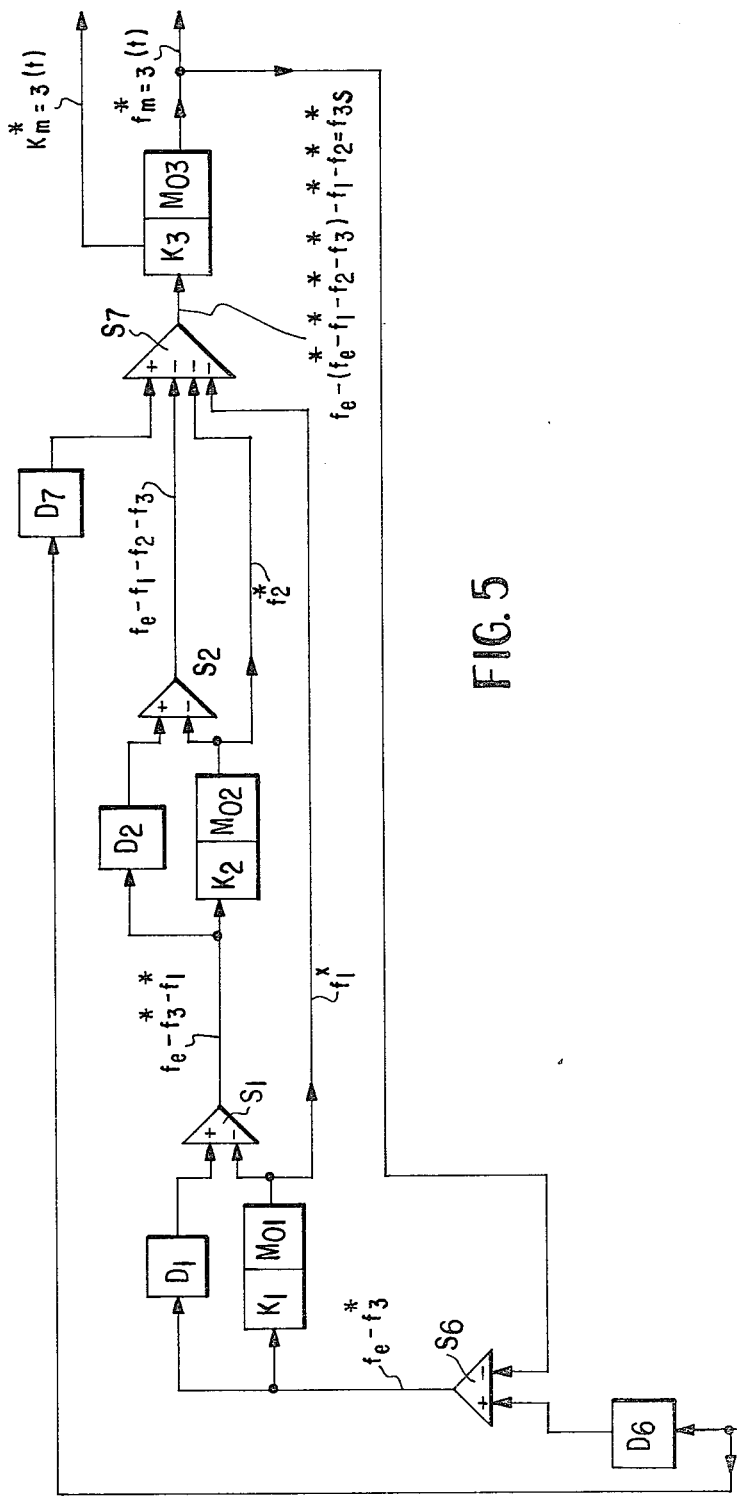
FIGS. 5 and 6 are schematic block circuit diagrams of modifications of the circuit of FIGS. 1 and 3 utilizing feedback in order to further suppress the undesired interference signals.

An arrangement utilizing such a feedback is shown in FIG. 5. Modulator $M_{03}$ again forms from the desired received function $K_{m=3}*(t)$ the high frequency transmitting function $f_{m=3}*(t)$ corresponding to this received function. This transmitting function $f_{m=3}*(t)$ is then subtracted from the received mixture function $f_e(t)$ applied to the input of correlator $K_1$ by feeding the output of modulator $M_{03}$ back to one input of a subtraction member $S_6$ to whose other input is applied the received mixture function $f_e(t)$, which has been suitably delayed by a delay member $D_6$ and whose output is connected to the input of correlator $K_1$. As a result of the subtraction in subtracting circuit S₆, the signal applied to the correlator, $f_e - f_3^*$, is now free from the desired received function ($f_3$) and the correlation processes $K_1$, $M_{01}$; $K_2$ $M_{02}$, which are performed in the usual manner as in the earlier discussed figures, can be performed with less errors. The output value of modulator $M_{02}$, the output value of modulator $M_{01}$ and the output value of the subtraction member $S_2$ are subtracted in a subtraction member $S_7$ from the received mixture signal $f_e(t)$ which has been suitably delayed in delay member $D_7$. The signal appearing at the output of $S_7$ is marked $f_{3S}^*$ in FIG. 5. From this value, correlator $K_3$ produces the desired received function $f_{m=3}^*(t)$ which is subsequently fed back to the subtraction member $S_6$.

Figure 6:
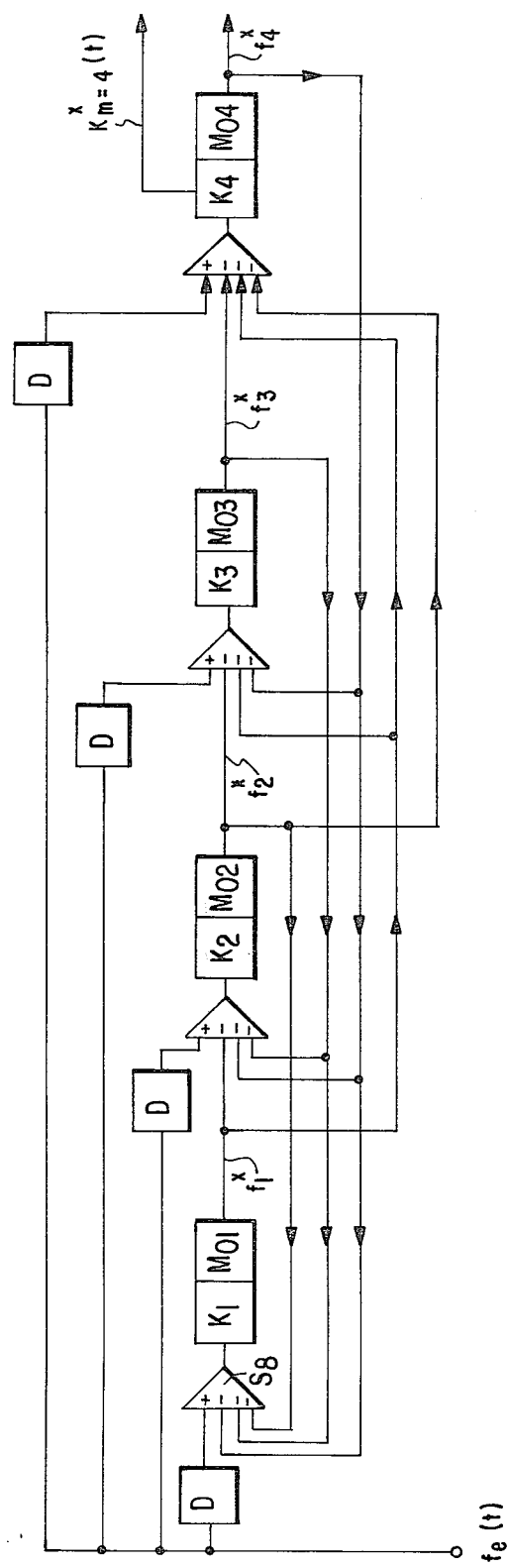

Feedback correlation may also be provided in that the output of any desired correlation stage is fed back to any other stage as shown in FIG. 6 or a plurality of such feedbacks are installed. A favorable feedback combination is the feedback connection of the outputs of the modulators with the inputs of the subtracting circuits wherein the feedback of transmitting functions produced at the receiving end takes place in almost every stage. Here the feedback occurs from the output of modulator $M_{02}$ to a subtraction member $S_8$ disposed in front of correlator $K_1$ so that correlator $K_1$ receives an input value which no longer contains the function $f_2^*$. In an analogous manner, the output value $f_3^*$ of modulator $M_{03}$ is subtracted from the input value fed to correlator $K_1$ and correlator $K_2$, and the output value $f_4^*$ of modulator $M_{04}$ is subtracted from the input values of all the correlators in front thereof. This assures that the individual correlators receive input values from which numerous received functions which could only hinder the correlation in the respective correlator have already been subtracted.

It will be understood that the above description of the present invention is susceptible to various modifications, changes and adaptations and the same are intended to be comprehended within the meaning and range of equivalents of the appended claims.

Appendix

Explanation of terms appearing in the specification:
i = running index of the stations;
j = number of the transmitted binary digit at the time
t = jT cos ω$_i$t = carrier of the station i;
cos $ω_i^*t - \phi_i^*$ = derived carrier in station m to correlate the; signals from the station i;
T = duration of an information bit;
$a_i(t-jT)$ = address, which is transmitted from station i at the time (t-jT) and is modulated by the information bit j;
$a_i^*(t-jT-\tau_i^*)$ = derived address from station i to correlate in station m to detect the information of station i;
$f_i(t)$ = time function, which is transmitted from the station i;
$f_i^*(t)$ = reproduction of $f_i(t)$ in station m;
$\tau_i$ = the time delay from the i-th station to another station;
$\phi_i$ = the phase of the carrier, received in a receiving station from the i-th station, relative to a reference phase;
$f_e(t)$ = the mixed signal received in station m;
$f_m(t)$ = the transmitting function from station i to station m;
$f_e^*(t)$, $f_e^{**}(t)$ = functions which consist of the difference between $f_e(t)$ and reproduced functions $f_i^*(t)$;
$K_m(t)$ = time function of the binary data signals, sent from station i to station m;
$k_{ij}$ = binary signal sent from station i at the moment t = jT;
$K_m^*(t)$ = reproduced time function of the binary data signal in station m, sent from station i;
$k_{mj}^*$ = reproduced binary digit in station m at the moment t = jT sent by station i;
$g^*a_m(t)$ = reproduced address with carrier in station m not yet exactly synchronized and carrier-controlled to the desired received address; and
$a_m$ = the address of the station m.

I claim:

1. In an SSMA data transmission system in which each binary information signal ($k_{ij}$), where i and j is equal to 1, 2, 3 . . ., is multiplied with a binary address $a_i(t-jT)$ having Z binary digits to form a data function $K_i(t) \cdot a_i(t-jT)$ and is transmitted as a function $f_i(t)$ after being modulated onto a carrier oscillation signal cos ($ω_i t$), and wherein the $m^{th}$ user station at the receiving end determines the interfered-with received function $K_m^*(t)$ intended for it by correlation of the received total mixture signal $f_e(t)$ with its own carrier modulated address $g^*a_m(t)$, the improvement wherein station m includes means for reproducing the transmitted data-functions $K_i(t)$ by $K_i^*(t)$ of at least one of the stations i ≠ m by correlation of the received signal $f_e(t)$ by $g^*a_i(t) = a_i^*(t-jT-\tau_i^*)$ cos ($ω_i^*t - \phi_i^*$) and forming $$f_i^*(t) = K_i^*(t) \cdot a_i^*(t - jT - \tau_i^*) \cos(\omega_i^* t - \phi_i^*);$$

means for subtracting each of the thus reproduced transmitting functions $f_i^*(t)$ from the received mixture signal $f_e(t)$ to produce a derived received signal $f_e^*(t)$; and means for determining the desired data sequence $K_m^*(t)$ by correlating only the signal $f_e^*(t)$ with the address $g^*a_m(t)$ for the $m^{th}$ station.

2. An SSMA data transmission system as defined in claim 1 wherein said reproducing means includes a plurality of correlators, one for each of the functions $K_i(t)$, and a plurality of modulators, one connected to the output of each of said correlators, for modulating the output $K_i^*(t)$ therefrom to produce the function $f_i^*(t) \approx f_i(t)$.

3. An SSMA data transmission system as defined in claim 2, wherein each of said plurality of correlators includes means for correlating the received total mixture signal with the address $g^*a_i(t)$ (i ≠ m) of one of said user stations.

4. An SSMA data transmission system as defined in claim 3 wherein said means for subtracting includes a plurality of subtracting circuits each having one input connected to the output of a respective one of said modulators and its other input connected to the input of the corresponding correlator, the output of each of said subtracting circuits being connected to the input of a succeeding correlator; and wherein the received total mixture signal $f_e(t)$ is applied to the input of the first correlator $K_1$ whereby said plurality of correlators, modulators and subtracting circuits are connected in series; said first correlator and modulator deriving the function $$f_{e1}^*(t) = f_e(t) - f_{i=1}(t)$$

from $f_e(t)$ by correlation with $g^*a_{i=1}(t)$; the second correlator deriving the function $$f_{e2}^*(t) = f_{e1}^*(t) - f_{i=2}(t)$$

from $f_{e1}^*(t)$ by correlation with $g^*a_{i=2}(t)$, etc., until finally the function $f_e^*(t)$ is obtained from which the desired data sequence $K_m^*(t)$ is determined by correlation with $g^*a_m(t)$.

5. An SSMA data transmission system as defined in claim 3 wherein said plurality of correlators and modulators of said reproducing means are all connected in parallel with the inputs of each of the correlators connected to receive the total mixture signal $f_e(t)$ and the output of each of the respective modulators being connected to a respective input of said subtracting means whereby the output of said subtracting means is the function $$f_e^*(t) = f_e(t) - \sum_{i \neq m} f_i(t)$$

which is then correlated with $g^*a_m(t)$ to produce $K_m^*(t)$.

6. An SSMA data transmission system as defined in claim 3 wherein said subtracting means includes first and second subtracting circuits; said first subtracting circuit having one input connected to the output of a first one of said plurality of modulators to receive the function $f_1^*(t)$, its other input connected to receive the received total mixture signal $f_e(t)$, and its output connected to the input of a second one of said plurality of correlators; said second subtracting circuit having a first of its inputs connected to receive said received total mixture signal $f_e(t)$, a second of its inputs connected to the output of the modulator connected to the output of said second one of said plurality of correlators so as to receive the function $f_2^*(t)$, and a third input connected to receive the function $f_1^*(t)$ from the output of said first one of said plurality of correlators whereby the output of said second subtracting circuit is the function $$f_e(t) - f_1^*(t) - f_2^*(t).$$

7. An SSMA data transmission system as defined in claim 3 further including: means for forming the function $f_m^*(t)$ from the function $K_m^*(t)$; means for subtracting the function $f_m^*(t)$ from the received total mixture function $f_e(t)$ to provide a function $f_e^{**}(t) = f_e(t) - f_m^*(t)$; means for producing and subtracting the functions $f_{m-1}^{}(t)$, $f_{m-2}^{}(t)$, etc., from the function $f_e^{}(t)$ until the desired data function, e.g. $K_1^{}(t)$, has been obtained.

8. An SSMA data transmission system as defined in claim 3, further including: means for forming the function $f_m^*(t)$; a further subtracting means having its output connected to the input of said reproducing means, means for applying said total mixture signal $f_e(t)$ to one input of said further subtracting means, and feedback means for applying said function $f_m^*(t)$ to the other input of said further subtracting means whereby the signal fed to the correlators of said reproducing means is $f_e(t) - f_m^*(t)$.

9. An SSMA data transmission system as defined in claim 3 wherein said subtracting means includes a plurality of subtracting circuits, each of said subtracting circuits having its output connected to the input of a respective one of said correlators and said total mixture signal $f_e(t)$ applied to one input thereof; and means interconnecting the outputs of said modulators with the inputs of said plurality of subtracting circuits so that the function $f_1^*(t)$ is produced from $f_e(t) - f_2^*(t) - f_3^*(t) - f_4^*(t) \ldots$;
the function $f_2^*(t)$ is produced from $f_e(t) - f_1^*(t) - f_3^*(t) - f_4^*(t) \ldots$;
the function $f_3^*(t)$ is produced from $f_e(t) - f_1^*(t) - f_2^*(t) - f_4^*(t) \ldots$;
the function $f_4^*(t)$ is produced from $f_e(t) - f_1^*(t) - f_2^*(t) - f_3^*(t) \ldots$ etc.

10. An SSMA data transmission system as defined in claim 2, including delay means, connected in the signal path of the total mixture signal $f_e(t)$ to said means for subtracting, for compensating for the delay caused by the reproducing means.

11. An SSMA data transmission system as defined in claim 10, including means, responsive to the energy of the output signal of said subtracting means, for controlling said modulators $M_0$ forming $f_i^*(t)$ from $K_i^*(t)$ and the said correlators $K_i$, so that the energy of the signal at the output of the subtracting means is minimized.

* * * * *